● OFF SPOOL (UNTREATED)
X 50:50 HNO₃:HF

United States Patent Office 3,698,970
Patented Oct. 17, 1972

3,698,970
METHOD OF STRENGTHENING SILICON CARBIDE COATED BORON FILAMENTS
Francis S. Galasso, Manchester, Bernarr A. Jacob, Torrington, and Jane P. Pinto, Glastonbury, Conn., assignors to United Aircraft Corporation, East Hartford, Conn.
Filed Dec. 21, 1970, Ser. No. 99,916
Int. Cl. C23g 1/02; C01b 35/00
U.S. Cl. 156—3                                                    7 Claims

ABSTRACT OF THE DISCLOSURE

A method for increasing the strength of silicon carbide coated boron filaments comprising subjecting the filaments to an etching solution of nitric and hydrofluoric acid, the solution consisting essentially of, by volume, 10–90% $HNO_3$, 10–90% HF, and the remainder, if any, $H_2O$. Further strengthening may be obtained by subjecting the treated filament to heating in air for approximately one hour at a temperature of 900°–1150° C.

BACKGROUND OF THE INVENTION

This invention relates to a method for increasing the strength of silicon carbide coated boron filaments and more particularly relates to a method for strengthening such filaments by immersing the same in a particular acid etching solution.

It is known that filamentary boron may be produced by pyrolytic techniques wherein the boron is deposited on a resistively heated wire which is drawn through a gaseous reactant stream consisting of a boron halide and hydrogen. One advantageous process, for example, is disclosed in the copending application entitled Method for Producing Filamentary Boron by Charles Rice, Ser. No. 618,511 filed Feb. 24, 1967, now U.S. Patent 3,549,424 and assigned to the same assignee as the present invention.

In order to exploit the high strength properties of filamentary materials such as boron, it is usual to encase them in an oriented manner in a matrix material which will deform plastically. Because of the reactivity of boron, however, the choice of matrix materials and the fabrication and operating temperatures of the materials in which it is incorporated have been limited. To remedy this, there has been developed the idea of providing a thin coating of a protective material thereon, such as silicon carbide or boron nitride. One process for depositing silicon carbide on boron filament is described in the copending application entitled Process for Forming Stoichiometric Silicon Carbide Coatings and Filaments by Malcolm Basche and Urban Kuntz, Ser. No. 618,512 filed Feb. 24, 1967, now U.S. Patent 3,622,369 and assigned to the same assignee as the present invention.

It is known that the strength of boron filaments having a thin coating, typically .01 to .50 mil in thickness, of silicon carbide in general depends on the strength of the boron filamentary substrate. In fact, the coated boron filament has exhibited a slightly lower average strength than the uncoated boron filament and this has been attributed primarily to the lower strength of the deposited silicon carbide and possibly to some degradation of the boron during the process. It has thus been the accepted view that the only way to increase the strength of silicon carbide coated boron filament is to use a higher strength boron filament as a substrate.

One proposed solution is to etch the boron filament, prior to coating with silicon carbide, preferably with aqueous nitric acid. This technique, while known to increase fiber strength, is not without its drawbacks since the process is difficult to control and generally causes enlargement of any small cracks in the boron fiber. As will be appreciated by those skilled in the art, the improvement in strength properties brought about by this boron etching process is not unexpected since boron fiber fractures often originate at the fiber surface.

SUMMARY OF THE INVENTION

The present invention contemplates a process for increasing the strength of a silicon carbide coated boron filament subsequent to the deposition of the silicon carbide coating. It further contemplates a process which is less sensitive to process parameters than prior boron etching processes.

According to one aspect of the invention, silicon carbide coated boron filament is exposed to a solution of nitric and hydrofluoric acid for a limited period of time, up to ten minutes. Substantial increases in strength have been achieved and, in one case, the strength of the filament was raised from 475,000 p.s.i. to 600,000 p.s.i. That any increase at all occurs is surprising and quite unexpected. Not only is a nitric-hydrofluoric acid solution not known to etch silicon carbide, but even if it did, it should provide little in the way of a strength increase since the fractures that occur often do so at the boron-silicon carbide interface and etching of the silicon carbide outer surface should have little, if any, effect.

According to a further aspect of the invention, it has been found that subsequent to treatment in the nitric-hydrofluoric acid etching solution, the strength of the composite filament may be further increased by heating in air for approximately one hour at a temperature of 900°–1150° C.

BRIEF DESCRIPTION OF THE DRAWINGS

A more complete understanding of the invention may be obtained with the aid of the drawings, wherein.

DESCRIPTION OF THE PREFERRED EMBODIMENT

Figure 1:
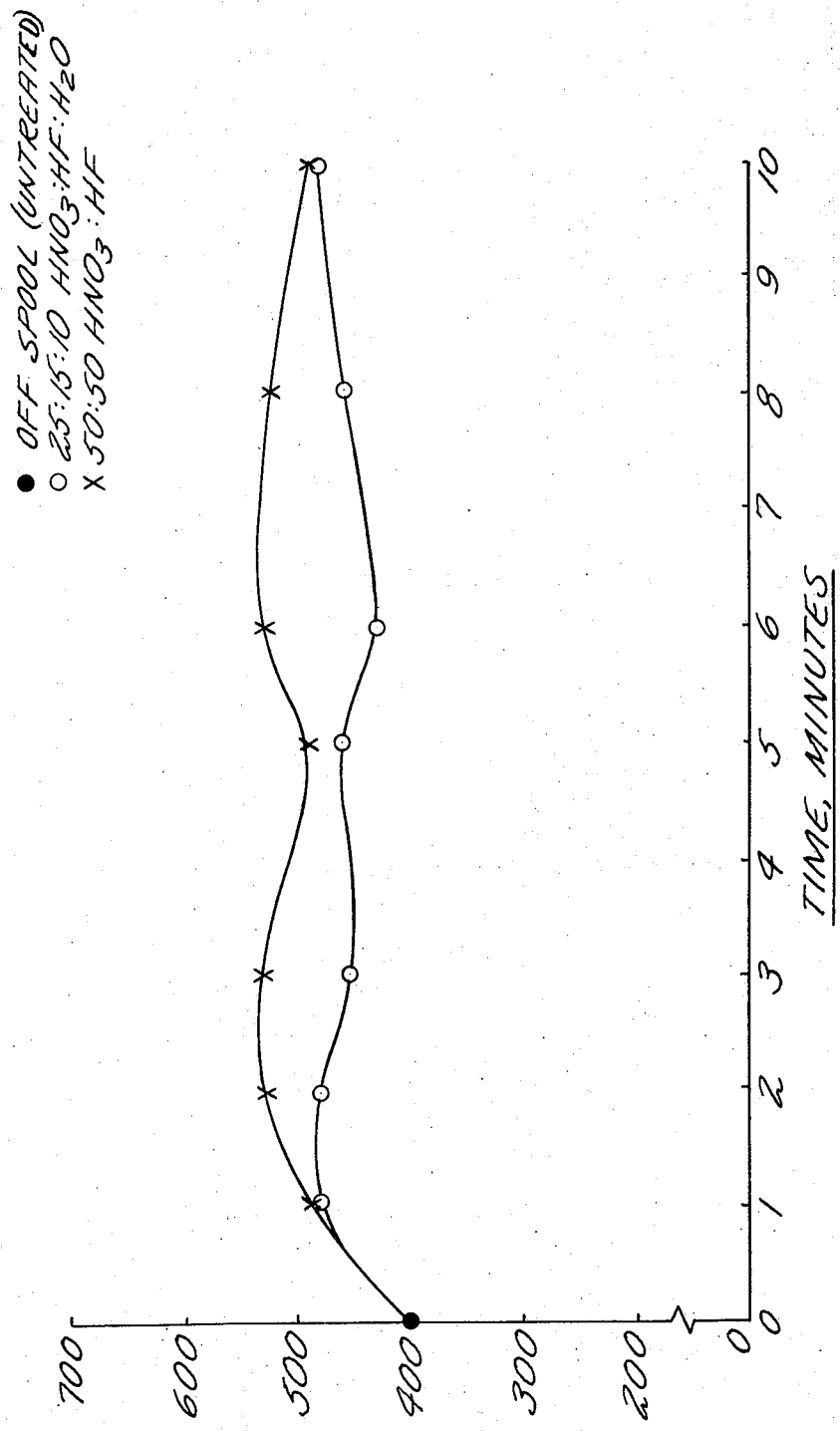
FIG. 1 represents a graphic presentation of tensile strengths of filaments as related to treatments.

In one preferred method for practicing the invention, boron filaments having a thin protective coating of silicon carbide are immersed in a solution (known to etch titanium) of nitric and hydrofluoric acid at room temperature for a limited period of time. In general, it is considered that an acid solution consisting essentially of by volume, 10–90% $HNO_3$, 10–90% HF, the remainder, if any, $H_2O$, may be employed although it appears that the greater strength increases will be obtained with the higher concentrations of HF. It has also been found that the period of immersion has a significant effect on strength, as shown in FIG. 1.

The following are representative examples of the method of operation:

Example I

Commercially available 4 mil silicon carbide coated boron filament sold under the registered trademark Borsic® was obtained from Hamilton Standard Division of United Aircraft Corporation. The Borsic has a silicon carbide thickness of 0.125 to 0.15 mil with an average tensile strength of approximately 400,000 p.s.i. Lengths of the Borsic were immersed in a solution consisting of, by volume, 50% $HNO_3$, 30% HF and 20% $H_2O$ for periods of 1, 2, 3, 5, 6, 8 and 10 minutes. The results are shown in FIG. 1.

Example II

Lengths of Borsic as described in Example I, were immersed in a solution consisting of, by volume, 50% $HNO_3$ and 50% HF for periods of 1, 2, 3, 5, 6, 8 and 10 minutes. The results are also shown in FIG. 1.

Electron microprobe analysis of cross sections of Borsic subjected to acid treatments employing various concentrations and soak times revealed that the silicon content in each filament compared very closely with the SiC standard and no free silicon metal was detected. Since an $HNO_3$—HF acid solution should not attack pure silicon carbide and since silicon is normally present in excess in the silicon carbide coating of the Borsic, it is likely that the acid solution etched the free silicon out. Further examination of the surface of the filaments with an electron probe showed no unusual amount of oxygen on their surface.

In general, while the acid treatment has shown itself to be effective in imparting strength increases to the Borsic-type filaments, it has been found that further strengthening may be had by subjecting the acid-treated fibers to elevated temperatures, as illustrated in the following example.

Example III

Figure 2:
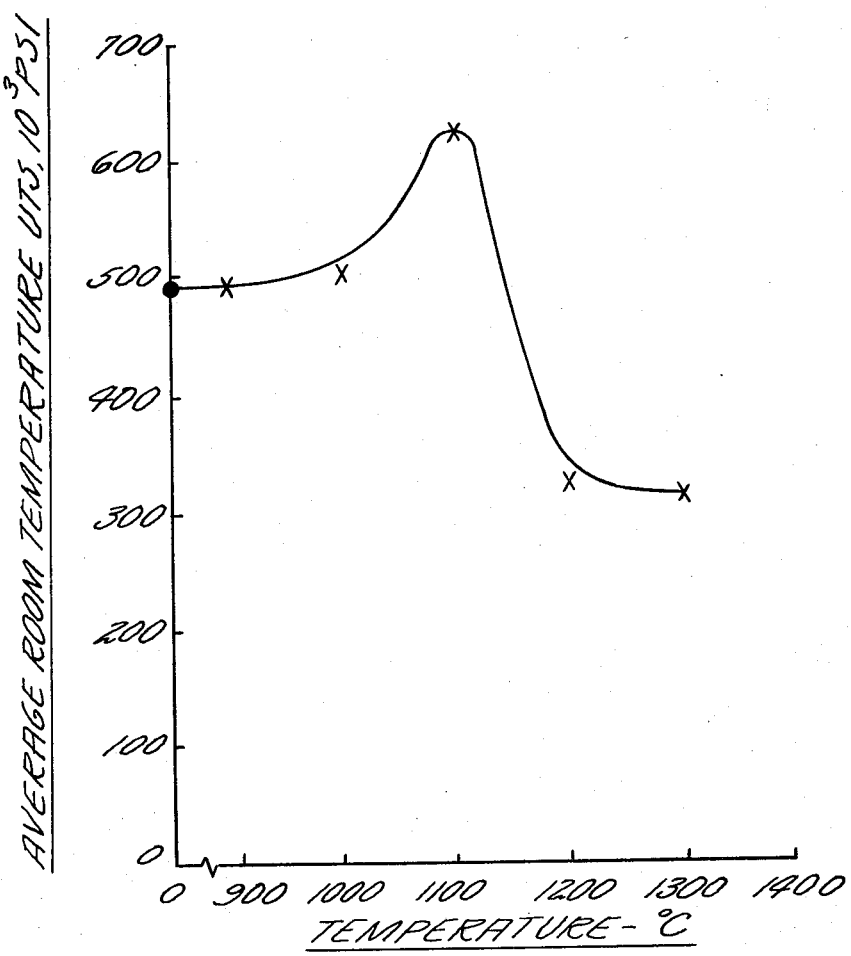
FIG. 2 represents a graphic presentation of tensile strengths of treated filaments as related to subsequent heat treatment.

Borsic treated for three minutes according to the procedure of Example II, were heat treated in air for one hour at temperatures of 900° C., 1000° C., 1100° C., 1200° C., and 1300° C. The results are shown in FIG. 2 Previous experiments had shown that the same heat treatment of Borsic which had not been acid-treated did not increase the filament strength. Rather, the fiber merely retained its strength through 1200° C. and then fell off drastically at 1300° C. to values of 75,000–125,000 p.s.i.

The combined acid and heat treatment results in data that show that the filament maintains its room temperature strength after one hour at 900° C. and 1000° C., increases its strength by 125,000 p.s.i. at 1100° C. (some strength values were greater than 700,000 p.s.i.) but then drops for a loss of 175,000 p.s.i. at 1200° C. which is maintained after one hour at 1300° C.

We claim:

1. A method of increasing the strength of silicon carbide coated boron filaments which comprises immersing the filaments in an etching solution of nitric and hydrofluoric acid, said solution consisting essentially of, by volume, at least 10% $HNO_3$, at least 10% HF, remainder, if any, $H_2O$.

2. The method of claim 1 wherein said filaments are immersed for a period of time of up to ten minutes.

3. The method of claim 1 wherein said filaments are etched for a period of time ranging from approximately two to three minutes.

4. The method of claim 2 wherein said filaments after etching, are heated in air for approximately one hour at a temperature of 900°–1150° C.

5. The method of claim 1 wherein said solution consists essentially of approximately, by volume, 50% $HNO_3$, 30% HF and 20% $H_2O$.

6. The method of claim 1 wherein said solution consists essentially of approximately, by volume, 50% $HNO_3$ and 50% HF.

7. The method of claim 1 wherein said silicon carbide coating is 0.1 to .50 mil thick.

References Cited

UNITED STATES PATENTS 2,992,080   7/1961   Herrick _____ 156—2

OTHER REFERENCES

Some Etching Studies of Boron by Ellis, Boron by Kohn et al., Plenum Press, New York, p. 135.

JACOB H. STEINBERG, Primary Examiner

U.S. Cl. X.R.

156—2, 6, 17